(12) United States Patent
Sadlier

(10) Patent No.: US 8,435,372 B1
(45) Date of Patent: May 7, 2013

(54) MANUFACTURE OF VERSATILE FLEXIBLE COVER USING MANDREL

(75) Inventor: Claus E. Sadlier, Woodside, CA (US)

(73) Assignee: Les Industries Touch Inc., Sherbrooke, Quebec (CA)

( * ) Notice: Subject to any disclaimer, the term of this patent is extended or adjusted under 35 U.S.C. 154(b) by 70 days.

(21) Appl. No.: 13/160,895

(22) Filed: Jun. 15, 2011

Related U.S. Application Data

(60) Continuation-in-part of application No. 12/847,730, filed on Jul. 30, 2010, now Pat. No. 8,007,615, which is a division of application No. 11/840,019, filed on Aug. 16, 2007, now abandoned.

(51) Int. Cl.
*B32B 37/04* (2006.01)

(52) U.S. Cl.
USPC ......... 156/161; 156/494; 156/196; 156/308.4

(58) Field of Classification Search .................. 156/161, 156/196, 308.4, 229, 70, 383, 494
See application file for complete search history.

(56) References Cited

U.S. PATENT DOCUMENTS

| | | | |
|---|---|---|---|
| 409,354 A | 8/1889 | Green | |
| 1,997,738 A | 4/1935 | Maxedon et al. | |
| 2,064,411 A | 12/1936 | Brandstein | |
| 2,082,108 A | 5/1937 | Brandstein | |
| 2,478,121 A | 3/1945 | Morner | |
| 2,466,643 A | 4/1949 | Magid | |
| 2,484,340 A | 10/1949 | Gardner | |
| 2,490,451 A | 12/1949 | Magid | |
| 2,580,075 A | 12/1951 | Clark et al. | |
| 2,768,107 A | 10/1956 | Magid | |
| 2,903,034 A | 9/1959 | Vrana | |
| 3,246,446 A | 4/1966 | Powers | |
| 3,403,409 A | 10/1968 | Wagenfeld | |
| 3,505,149 A | 4/1970 | Sanchez | |
| 3,560,292 A | 2/1971 | Butter | |
| 4,132,156 A | 1/1979 | Glaze | |
| 4,509,570 A | 4/1985 | Eby | |
| 4,560,434 A | 12/1985 | Sato | |
| 4,690,248 A | 9/1987 | Killeen | |
| 4,691,390 A | 9/1987 | McKeown | |
| 4,765,854 A | 8/1988 | McKeown | |
| 4,797,523 A | 1/1989 | Kohnen | |

(Continued)

FOREIGN PATENT DOCUMENTS

| | | |
|---|---|---|
| WO | WO 0039005 A1 | 7/2000 |
| WO | WO 03106281 A1 | 12/2003 |
| WO | WO 2005115860 A1 | 12/2005 |

*Primary Examiner* — Khanh P Nguyen
*Assistant Examiner* — Vishal I Patel
(74) *Attorney, Agent, or Firm* — David Pressman

(57) ABSTRACT

A flexible container cover with an elastic gathering band around its edge is formed from a rectangular sheet of plastic film with recessed cut corners to form four flaps. The sheet is placed atop a mandrel having a rectangular flat top with eaves or undercut surfaces and four corner slots. Four hooks are positioned outside the slots so they underlie the cut-off corners of the sheet. An elastic band is stretched around the hooks and the flaps of the sheet. The hooks are moved inwardly into the slots to allow the segments of the band to pull and fold a middle portion of each flap inward. A set of tucker blades is then moved inward to push the folded portions of the flaps against side surfaces of the mandrel under the eaves. Four heat-sealing bars are moved up against the eaves to seal the flaps around the segments of the band to form hems.

20 Claims, 13 Drawing Sheets

U.S. PATENT DOCUMENTS

| | | |
|---|---|---|
| 4,844,248 A | 7/1989 | Forberg et al. |
| 4,938,607 A | 7/1990 | Kelley |
| 5,325,986 A | 7/1994 | Richardson et al. |
| 5,624,729 A | 4/1997 | Cohen et al. |
| 5,690,248 A | 11/1997 | Hulls |
| 6,276,551 B1 | 8/2001 | Miller |
| 6,351,852 B1 | 3/2002 | Propp |
| 6,820,283 B2 | 11/2004 | Graneto |
| 6,887,061 B2 | 5/2005 | Donovan et al. |
| 6,994,469 B2 | 2/2006 | Sleight et al. |
| 7,011,228 B2 | 3/2006 | Ordiway |
| 7,051,895 B2 | 5/2006 | Toussant et al. |
| 3,035,960 A1 | 9/2007 | Farkas et al. |
| 2004/0086205 A1 | 5/2004 | Raterman |
| 2004/0099666 A1 | 5/2004 | Ordiway |
| 2004/0251256 A1 | 12/2004 | Turvey et al. |
| 2007/0036472 A1 | 2/2007 | Persenda |

MANUFACTURE OF VERSATILE FLEXIBLE COVER USING MANDREL

CROSS-REFERENCE TO RELATED APPLICATIONS

This is a Continuation-In-Part of application Ser. No. 12/847,730, Filed Jul. 30, 2010, U.S. Pat. No. 8,007,615, granted Aug. 30, 2011, which is a Division of application Ser. No. 11/840,019, Filed Aug. 16, 2007, abandoned.

BACKGROUND

Prior Art

In households, there are often leftovers that should be covered and preserved, e.g., in a refrigerator, to keep them from drying out and getting contaminated. Most leftovers are put in an open container, such as a bowl or casserole dish, or on a plate. There are primarily three types of covering arrangements of which I am aware.

The first is a fixed-size container lid which is sized and manufactured to fit a specific container. For example plastic food storage containers such as those sold under the trademark Tupperware are generally sold with matching plastic lids. This approach requires that a specific matching lid be available to cover the container. Such lids cannot be used on a container which has a different size or shape than the one for which it was designed.

The second type of arrangement for covering plates as well as containers is flexible plastic film and foil generally provided in a continuous sheet on a roll, such as rolls of plastic wrap sold under the trademark Saran, or foil sold under the trademark Reynolds. In order to cover a bowl or plate the user simply cuts a length of the film or foil and manually molds the cut film or foil over the container. Although this system is flexible enough to cover containers of various sizes and shapes, it is often difficult to cut the film to the correct length and apply to a container without the film sticking to itself or its edges lifting from the container. Additionally it is difficult to re-cover a container with the same piece of film since plastic films lose their ability to stick to the container after prolonged use and aluminum foil tears and becomes wrinkled. Also, foil is not transparent, and as such does not allow someone to see what is being stored in the container. And because it is metallic it can not be used in some microwave ovens and some users have health concerns about using aluminum next to foods, particularly acidic foods such as tomato sauces.

The third type of plate and container covering system is a flexible film cover with an elastic band sewn along the edge. SC Johnson Co. used to sell a product similar to this under their trademark Quick Covers. This type of cover was originally developed and used as a shower cap and has been commercially available for many years. This "shower cap" type cover is made from a circular sheet of plastic film with a strip of elastic sewn directly around the perimeter. There are four major drawbacks to this design. The first is that it is unsanitary and unsightly for use with food items due to the fact that the elastic band is sewn into the plastic so that the thread and the ends of the elastic are not contained within and often hang from the cover. When the thread gets wet it could promote the growth of bacteria and produce a food safety issue. The second drawback is that the exposed elastic band emits an undesirable rubbery smell. The third drawback is that these covers cannot be mass produced on high speed machinery. The forth drawback is that these covers do not fit both elliptical and rectangular containers with similar size openings and therefore have relatively low versatility.

Patents 2,466,642 and 2,490,451 to Magid (1949) disclose a method of making a cover whereby an elastic band is heat sealed into a hem along the periphery of circular sheet of plastic film. Although this design eliminates the unsanitary and undesirable smell and aesthetics of the traditional shower-cap type cover, these do not fit both elliptical and rectangular containers with similar size openings and therefore are not as versatile. In addition the process produces a cover in which the sealed edge faces the outside of the cover (as shown in FIG. 4 of the '451 patent). This makes the product look less finished and not esthetically pleasing. As a result these covers have never achieved commercial success, insofar as I am aware.

International publication number WO 2005/115,860 A1 (2005) to B-New International AB discloses a cover made from an octagonal sheet with an elastic band heat sealed into a hem along each of the eight sides. There are a number of deficiencies with this cover. As with previously mentioned covers, these covers do not fit both elliptical and rectangular containers with similar size openings and therefore are not as versatile. Secondly, in order to manufacture this cover, eight holes or wedge shaped openings must be formed into the cover. This quantity of holes or openings makes the product look defective, less finished and not esthetically pleasing. In addition it allows the elastic band to be exposed to the air which can increase the amount of odor being emitted from the rubber. Third, the fact that the cover has eight sides which must be folded and sealed, combined with the tight tolerance and acute angle between each pair of adjacent sides, make it difficult to manufacture.

ADVANTAGES

Accordingly, some advantages of one or more aspects are to provide an improved cover that a) can fit containers and plates a variety of shapes, b) has a cinching band that is more sanitary and esthetically pleasing, c) is made with a more aesthetically pleasing seam, d) can be made without having to form eight holes around the edge of the cover, and e) can fit a wider variety of sizes of containers. Other advantages are to provide a cover that f) can be printed, g) can be used to reheat food in a microwave oven, h) can be easily manufactured, in one or more aspects, (i) can have perforations to allow steam to escape when used for re-heating food in a microwave oven, (j) can be automatically stripped from the forming mandrel apparatus, (k) can be made on high speed machinery, and (l) can be integrated into an automated assembly line process. Further advantages of one or more aspects will become apparent from the ensuing description and accompanying drawings.

SUMMARY

In accordance with one embodiment, a more versatile flexible cover is formed from a rectangular sheet of plastic film material and a continuous elastic or rubber band. The sheet has a predetermined amount of material cut from each corner. The sheet is placed onto a table between four posts that extend from the table. The sheet is positioned so that a post lines up with each corner of the sheet. A rubber or elastic band is stretched across the four posts into a square and rests just above the sheet. The stretched band now has four sides which correspond to the four sides of the sheet. Next, each of the side edges of the sheet are folded inward and over the stretched band and heat sealed directly to the sheet. The band is now sealed within a pocket that is formed around the edges of the sheet. Each corner of the stretched band is then released from its post, which causes the band to relax and pull the four corners of the sheet toward the center. This creates a balloon or generally spherical shaped cover which can be used on covers of a variety of shapes, including rectangular and circular openings of similar sizes.

In accordance with another embodiment a more versatile flexible cover is formed by providing a forming machine apparatus comprising a rectangular shaped forming mandrel having a flat top surface, an undercut surface, a side surface, and a slot cut into each corner. The forming mandrel moves vertically up and down and is initially positioned upward. A pin or a hook is positioned at each corner of the mandrel and can be moved laterally in and out of each respective corner slot. The hooks are initially positioned laterally outward from each slot. A sealing bar containing a heating element is positioned along each side of the mandrel with the heating element portion of the sealing bar being positioned below the undercut surface of the mandrel. A tucker blade is positioned adjacent each side of the mandrel tha and can be moved laterally inward toward the side and back out again. Next, a rectangular sheet of flexible plastic film is provided in which material is cut from, or cut out of each corner to create a recess or space from the apparent intersection of each pair of adjacent sides, thereby creating a flap along each side of the sheet. The sheet is laid flat on the top surface of the forming mandrel with the flaps extending past the sides and the hooks positioned within the recess or space cut out of each corner of the sheet. Next an elastic band is stretched around the hooks in a rectangular configuration having four straight sections that respectively run parallel to each respective side of the mandrel, and run along the top of the central region of each respective flap. The hooks are then moved laterally inward into the mandrel slots. This causes the elastic band to contract and serve as a fulcrum. The center portions of each flap folded inward over the fulcrum, creating a hem with an open end facing outward from the mandrel and a folded edge facing the side of the mandrel. Next the tucker blades are moved laterally inward into the open end of the hem to press the rubber band and folded edge evenly against the sides of the mandrel. Then the tucker blades are moved laterally outward into their starting position and the mandrel is moved downward so that the undercut surface presses against the sealing bars, thereby closing the hem. The heating element is activated and the hem is sealed through the application of heat and pressure to form a pocket and heat-sealed seam. Finally the mandrel is moved back up into its starting position and the hooks are extended laterally back out of the slots to automatically strip the formed cover from the undercut and side surfaces of the forming mandrel.

In another aspect a fully automated forming machine is provided comprising die cutting, band applying, cover forming, cover stripping, and product accumulating sections. In timed sequence a die cutter station cuts or punches the sheet from a roll of film. Next the sheet is automatically placed onto the forming mandrel of the forming machine. Then an elastic band applying apparatus stretches and applies an elastic band around the forming mandrel. The forming mandrel forms and seals a hem containing the elastic band along the sides of the sheet. The cover is then stripped from the forming mandrel. Lastly, an accumulator picks the stripped cover and stacks the covers in an accumulation bin for final packaging.

These and other aspects and features of various embodiments will become more apparent from the following detailed description when taken in conjunction with the accompanying drawings.

DRAWING FIGURES

DRAWING - REFERENCE NUMERALS

| | | | |
|---|---|---|---|
| 10 | film sheet | 10' | film sheet |
| 10C | diagonal and straight corner cut | 10FE | folded edge |
| 10C' | plain diagonal corner cut | 10C" | curved corner cut |
| 10I | inside surface of film sheet | 10LS | long side |
| 10S | side. | 10SS | short side |
| 10UF | unfolded flap | 10F | flap |
| 10FF | folded flap | 11 | elastic band |
| 11S | elastic band in a stretched state | 11R | elastic band in relaxed state |
| 12 | corner post | 13 | seam |
| 13H | heat seal area | 13P | pocket |
| 14 | corner | 14J | corner joint |
| 14P | corner pleats | 15 | cover |
| 15' | cover | 15O | cover opening |
| 15B | cover body | 16 | printed corner mark |
| 17 | perforations | 18R | round container |
| 18S | square container | 19 | forming apparatus |
| 20 | base plate | 22 | mandrel |
| 24 | tucker blade | 24C | tucker blade air cylinder |
| 24R | tucker blade rod | 26 | sealing bar |
| 26' | sealing bar | 28 | hook |
| 28' | hook | 28R | hook rod |
| 28C | hook air cylinder | 29 | locator groove or notch |
| 30 | mandrel air cylinder | 32 | heating element |
| 38 | mandrel undercut surface | 38' | mandrel undercut surface |
| 39 | mandrel side surface | 40 | hem |
| 42 | recessed corner cut | 43 | corner space |
| 44 | clearance slot | 46 | expandable corner |
| 48 | expandable opening | 50 | expansion joint |
| 100 | turntable | 110 | station 1 |
| 112 | station 2 | 114 | station 3 |
| 116 | station 4 | 120 | die cutting apparatus |
| 122 | band applying apparatus | 124 | feeding pins |
| 126 | accumulating apparatus | 128 | reciprocating arm |
| 130 | accumulating bin | 132 | roll of film |
| 134 | vacuum cup | | |

DETAILED DESCRIPTION AND OPERATION

Figure 1A:
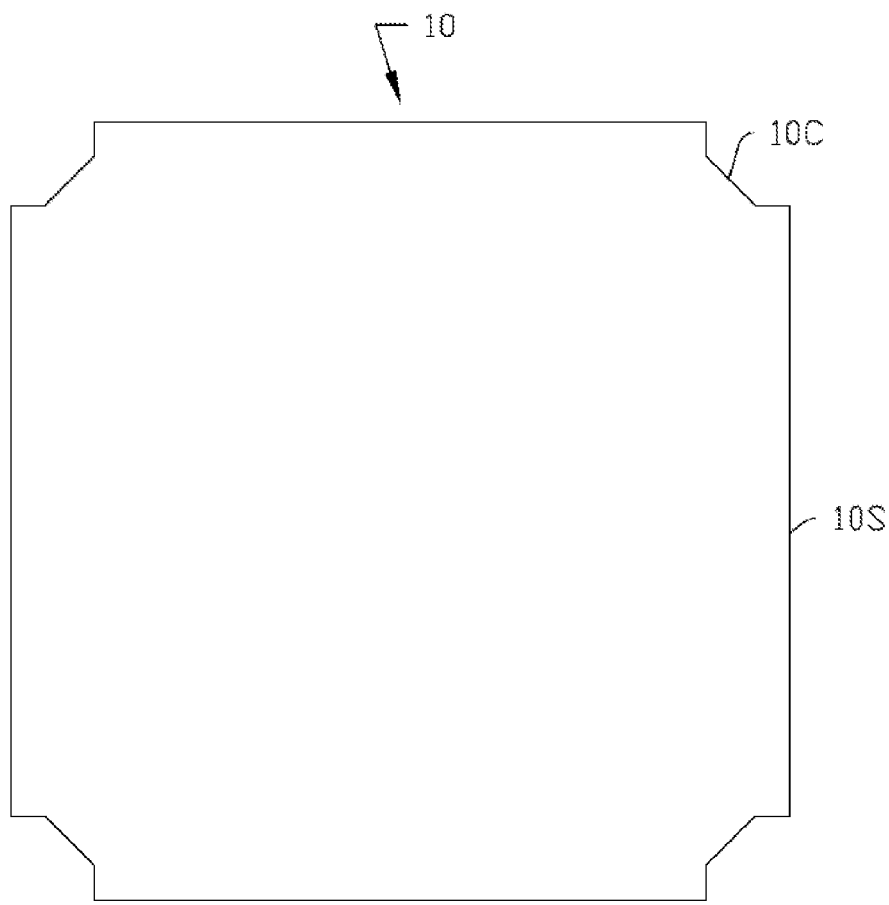
FIG. 1A is a plan view of a film sheet used to make a more versatile flexible container cover.
Figures 1B, 1C:
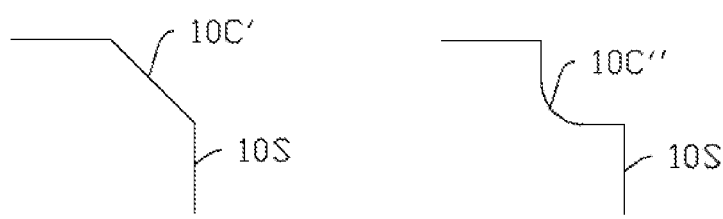
FIG. 1B is a partial plan view of an alternative corner cut configuration.
FIG. 1C is a partial plan view of another alternative corner cut configuration.

First Embodiment—FIGS. 1a-1c

Figure 6A:
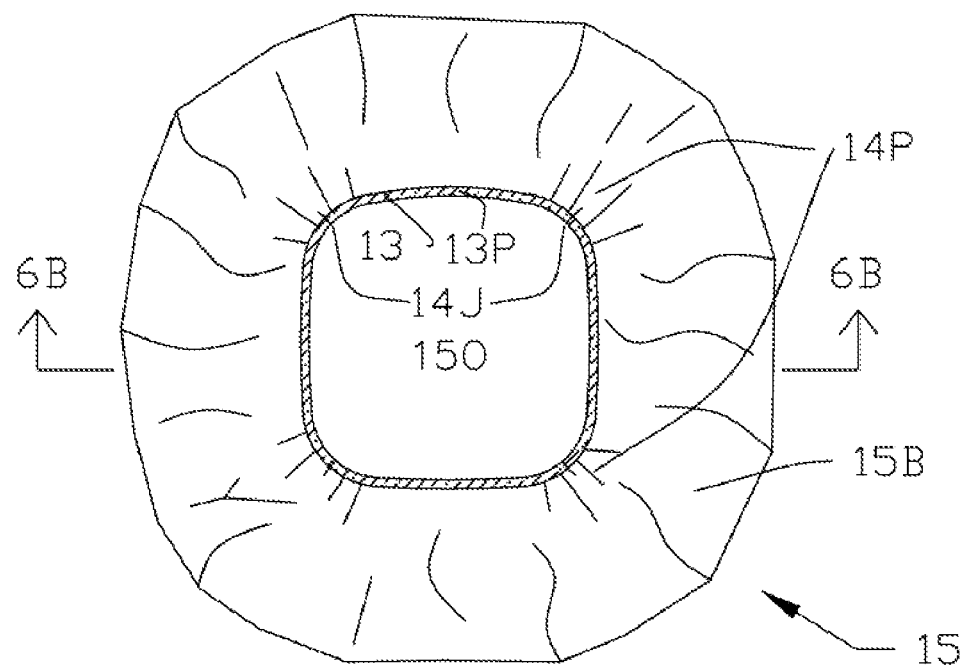
FIG. 6A is a plan view showing the cover with the elastic opening at the top.

FIG. 1A shows a plan view of a thin plastic sheet 10 of film material that is used to make the flexible cover of FIG. 6A. Sheet 10 is cut from a larger roll of material (not shown), the methods of which are well known in the industry. The sheet is rectangular in shape in its free, unfolded and ungathered state and has four sides 10S, where each pair of adjacent sides are 90 degrees apart. A cut 10C is made at each corner to remove a predetermined amount of material from each corner for reasons discussed below. Each cut has a diagonal center portion and two outer portions, each of which is perpendicular to the respective adjacent side 10S. Such corner cuts preferably are done when the sheet is cut from the roll. The sheet preferably is made from any thin plastic film material such as polyethylene, polypropylene, nylon, polyethylene terephthalate (PET) or any combination of these and other materials. All of these materials can be used in a microwave oven. Additionally a biodegradable film can be used, such as polylactic acid (PLA) or polyvinyl alcohol (PVA) which contains starch in order to be biodegradable. For this first embodiment low density polyethylene (LDPE) preferably is used due to its ability to stretch, its lack of stiffness, and its clarity. The thickness of the material can be in a range of between 0.01 mm to 0.076 mm (0.0004 to 0.003 inch). In this first embodiment a square LDPE sheet that is 36 centimeters by 36 centimeters (14 inches by 14 inches) with a thickness of 0.025 mm (0.001 inch) is used.

Figure 3:
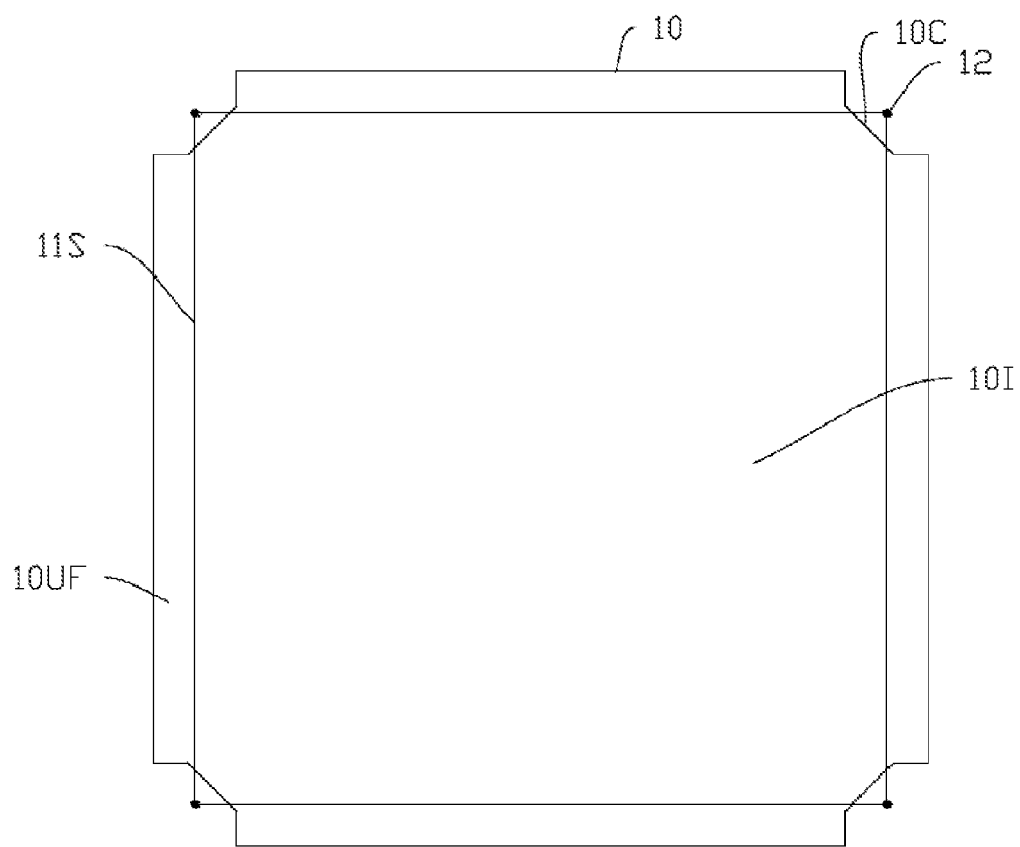
FIG. 3 is a plan view of the sheet with the elastic band stretched around four corner posts and resting above the sheet.

In lieu of the diagonal and rectangular corner cuts of FIG. 1A, each corner cut 10C can have any other shape and size so long as it allows room for a post to hold the rubber band above sheet 10 as shown in FIG. 3. For example a plain diagonal cut 10C' may be made as shown in FIG. 1B or a concave curved cut 10C" may be made as shown in FIG. 1C.

FIG. 2

Figure 2:
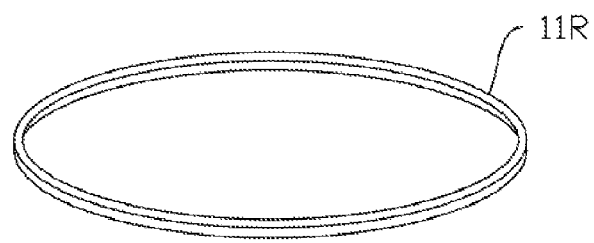
FIG. 2 is a perspective view of a relaxed elastic band used to make the cover.

FIG. 2 shows of perspective view of an endless elastic band or loop 11R in a relaxed and unstretched state that is used to make the flexible cover. The elastic band preferably is made from any thin elastic material such as latex (natural rubber), or latex-free material, such as polyisoprene, polyurethane, or a combination of these and other materials, in any color available. It has an unstretched or free length around its perimeter that is less than 50% of the length of the perimeter or periphery of the plastic sheet for reasons to be discussed below. All of these materials can be used in a microwave oven. For this first embodiment a white elastic band made from polyisoprene is used because it is a synthetic latex free material with good stretch characteristics. The cross sectional dimension of the rubber band can have a width and a thickness in the range of between 0.127 mm to 6.35 mm (0.005 to 0.250 inch). For this first embodiment a polyisoprene band having a free or unstretched length around its perimeter of 30.5 centimeters (12 inches) with a square cross section (equal width and thickness) of approximately 1.5 mm (0.060 inch) is used.

FIG. 3

FIG. 3 shows a plan view of sheet 10 lying flat on a table (not shown) with an inside surface 10I facing up, and with the elastic band of FIG. 2 stretched (now designated 11S) over the top of the sheet 10 and held in place by being secured around four corner holding posts 12 that project up from the table and are aligned with each corner of the sheet. Each corner cut 10C allows room for the post to hold the elastic band above the sheet without interfering with the folding process discussed below. A marginal area of each side of sheet 10 extends outside of stretched band 11S to form four elongated unfolded flaps such as 10UF.

FIG. 4

Figure 4A:
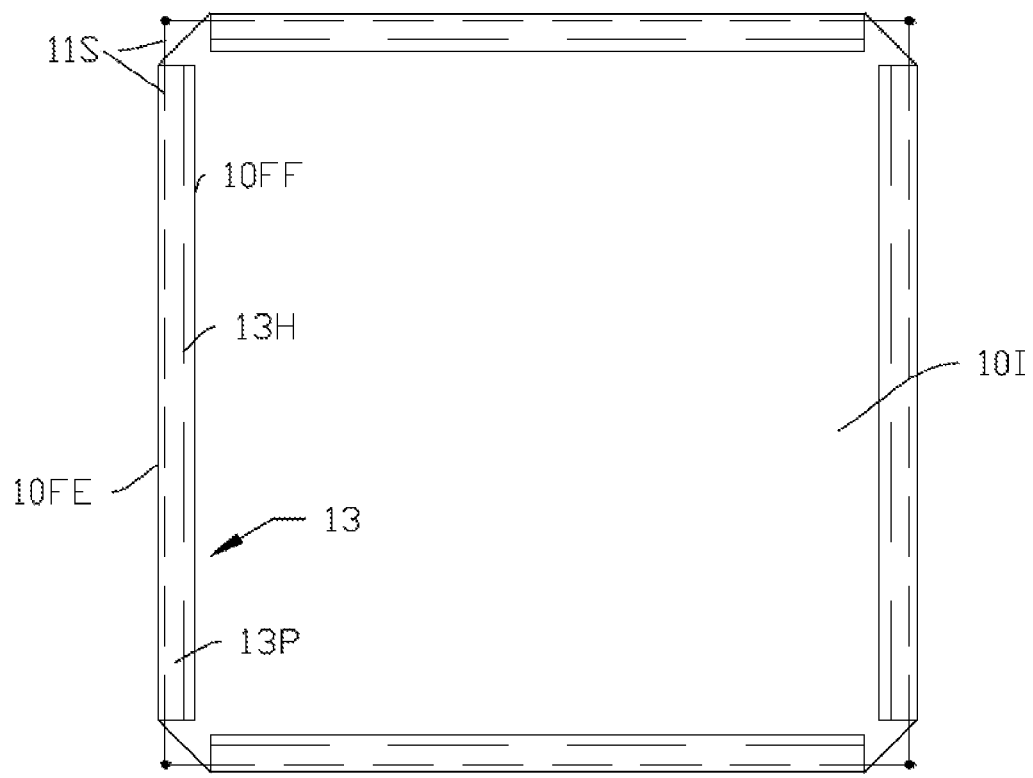
FIG. 4A is a plan view of the sheet with each of the side edges folded over the elastic band and sealed to the sheet.
Figure 4B:
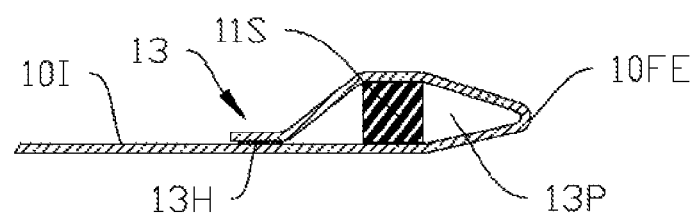
FIG. 4B is a partial side-sectional view of the folded and sealed edge forming a pocket which contains the elastic band.

FIG. 4A shows a plan view of the four flaps 10UF folded over the elastic band to become folded flaps 10FF that are heat sealed to the sheet along a sealing area 13H to form a seam 13. The process of heat-sealing the plastic sheet to itself is well known in the art. This can also be seen in the partial side sectional view of FIG. 4B. Seam 13 is on the inside or upper surface 10I of the sheet; this inside, upper surface will form the inside surface of the cover. An elongated pocket or sleeve 13P (FIG. 4B) is formed at the seam between folded edge 10FE and sealing area 13H within which elastic band 11S is contained. In order for sheet 10 to pleat and allow the elastic band to relax to form the cover, as will be shown later, the cross-sectional area of pocket 13P as shown in FIG. 4B should be at least 1.5 times as large as the cross sectional area of the elastic band in its stretched state. If the pocket is less than about 1.5 times the cross section area of the elastic band the sheet tends to bind up on the elastic band, restricting its ability to relax as will be detailed below.

FIG. 5

Figure 5:
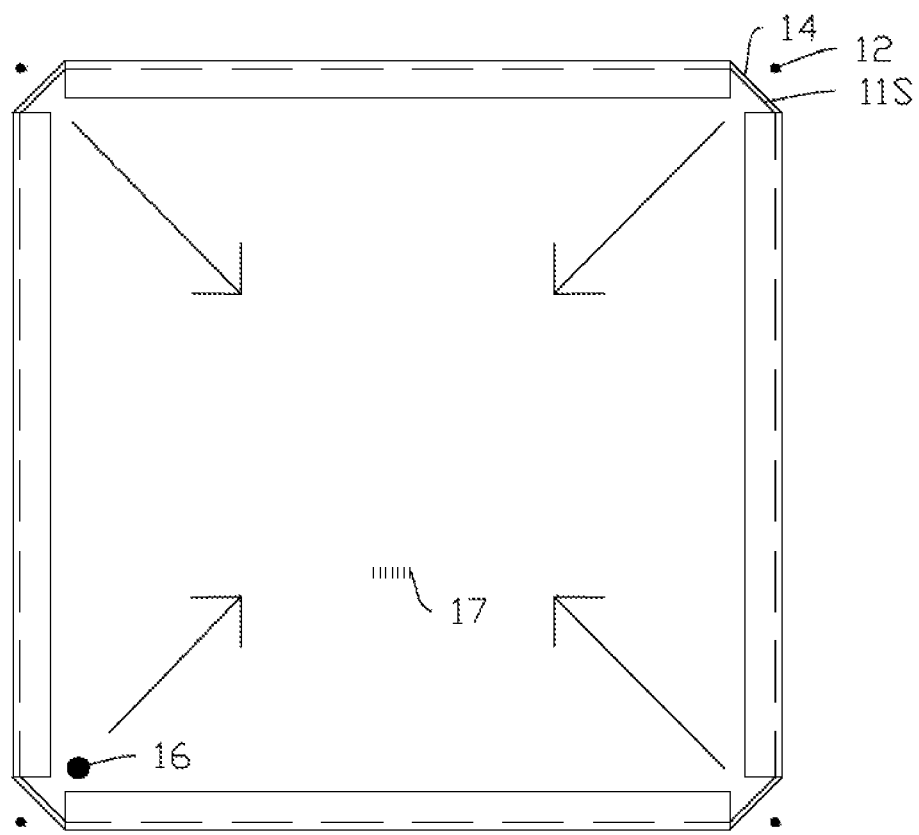
FIG. 5 is a plan view showing the elastic band being released from the corner posts with arrows indicating the direction that the corners will be drawn in as the elastic band is relaxed.

FIG. 5 shows a plan view of elastic band 11S after release from corner posts 12 and before band 11S contracts. FIG. 5 also shows an optional dot 16 that can be imprinted near one corner of sheet 10. Dot 16 makes it even easier for a user to identify the corners of the cover so that the corners of the cover can be aligned with the corners of a rectangular container. Any other suitable corner identifier can be used. Such marking preferably is done prior to cutting the sheet from the starting roll or, while the sheet is positioned on the table. For applications where the cover is used over food that is heated in a microwave, a hole or holes, perforations, micro perforations, or slits 17 can optionally be formed into the cover to allow steam to vent or escape more quickly from the cover as the food is being heated. Micro perforations are holes with a diameter of less than 0.5 mm (0.02 inch); these are small enough to prevent contaminates from entering the cover, but will allow steam to escape.

Figure 6B:
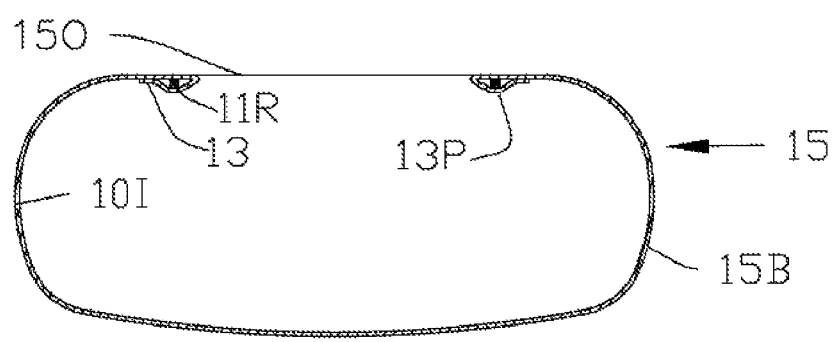
FIG. 6B is a side section view of the cover of FIG. 6A taken along the line 6B-6B of FIG. 6A showing the sealed edges facing the inside.

Once released, stretched band 11S will contract as shown by the arrows in FIG. 5 to a relaxed state which will have the effect of pulling each corner 14 inward and toward the center of the sheet. This action will roll or gather the edge portions of sheet 10 inward and place seam 13 on the inside of cover 15, as shown in FIGS. 6A and 6B. FIGS. 6A and 6B show finished cover 15 comprising a hollow cover body 15B with a generally circular or curved perimeter, a top and bottom layer and an expandable opening 150.
FIGS. 6A-6B FIG. 6A is a view of cover 15 with opening 150 at the center of the top layer and facing up. Opening 150 is bordered by seam 13, which is a generally rectangular shaped loop or ring with round corners. Opening 150 in FIG. 6A is formed by sleeves or pockets 13P (FIG. 4A) being drawn together at the corners so that the open ends abut to create a circumscribing ring or hem which houses elastic band 11R in its relaxed state. When the sheet is gathered the four exposed portions of the rubber band become covered by the ends of the adjacent sleeves coming together at the corners, forming an expandable corner joint 14J at the point of each junction or abutment as can be clearly seen in FIG. 6A.

Figure 7:
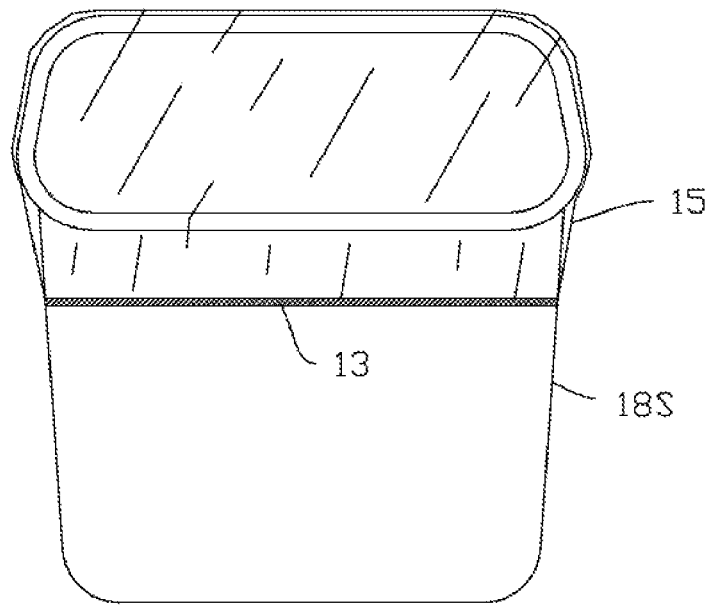
FIG. 7 is a perspective view of the cover covering a round container.
Figure 8:
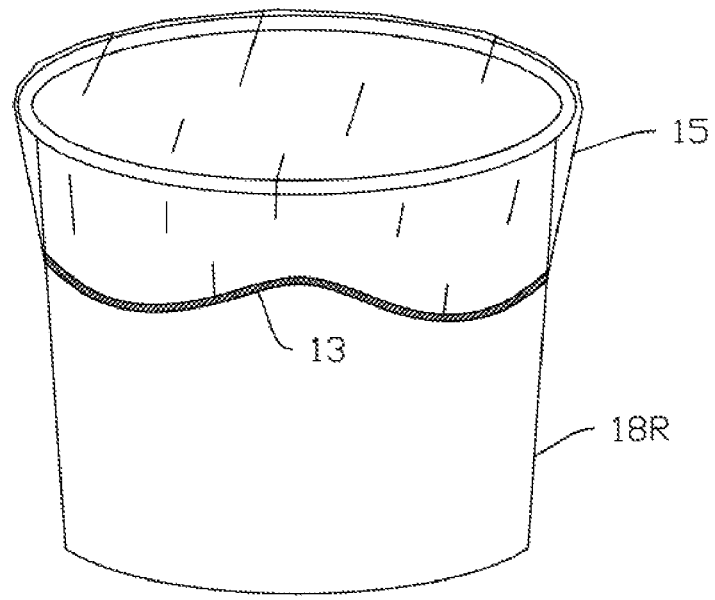
FIG. 8 is a perspective view of the cover covering a rectangular container.

Although the initial starting sheet is rectangular, cover 15 unexpectedly becomes substantially circular when the elastic is allowed to relax by pulling or gathering each corner to the center as shown in FIGS. 6A and 6B. This gathering process causes pleats to form between opening 150 and the perimeter of the cover as shown in FIG. 6A. Opening 150 has a near rectangular shape in its relaxed state (FIG. 6A) because more pleats form in the corners due to the excess of material that gathers at each corner as shown. By near rectangular shape I mean that the shape appears to have four corners. This gathering process collapses and stores the excess corner material of sheet 10 as additional corner pleats 14P shown in FIG. 6A. Thus corner pleats 14P (FIG. 6A) can be expanded back to form corners 14 (FIG. 5) as needed to cover rectangular containers as discussed below. The near rectangular shape of the opening with the additional corner pleats is beneficial because it allows the user to identify the corners of the substantially round shaped cover, or curved shaped perimeter, before placing it on a rectangular container. However, the rest of body 15B of the cover is generally circular in shape as if the starting sheet had been cut as a circle rather than a rectangle. The use of a rectangular starting sheet thus makes the cover easier to fabricate because the corners can be more easily identified and aligned with holding posts 12 and provides flaps 10UF which can easily be folded over or around four stretched segments of the elastic band and sealed to form a finished cover.
FIGS. 7-8

Figure 9:
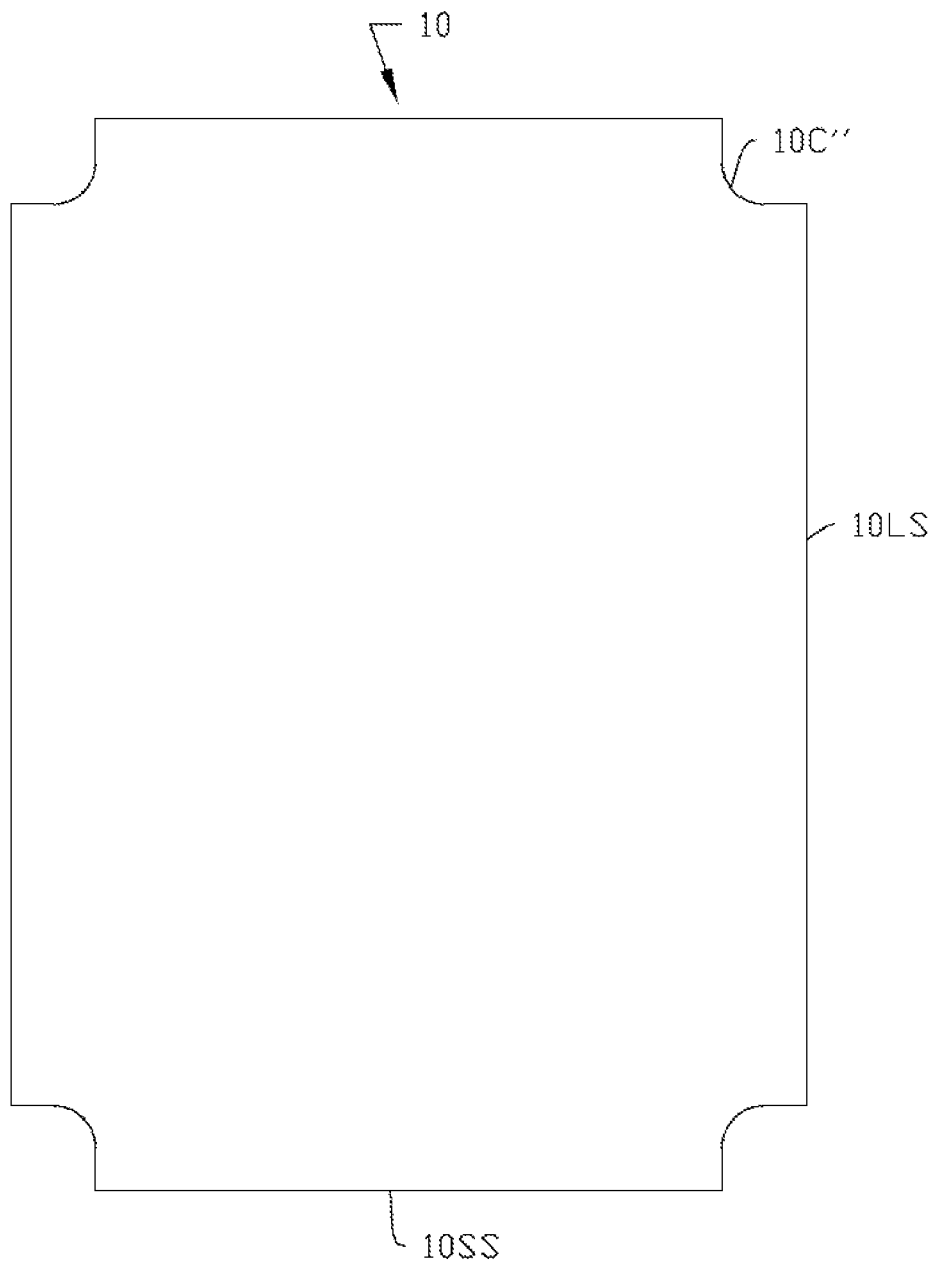
FIG. 9 is a plan view of a film sheet similar to that of FIG. 1 but with an oblong rectangular shape.

To use cover 15, opening 150 is simply stretched and the cover is placed over a plate (not shown) or a container 18S (FIG. 7) or 18R (FIG. 8) and released. This allows the elastic band to relax and contract, pulling the sheet tightly over the mouth of the container. Because of the rectangular shape of the starting sheet, the cover can be placed on both round containers 18R and square containers 18S with similar size openings. For example a cover that is sized to fit a 25.4-cm (10-inch) diameter circular plate will also fit a 25.4 cm (10-inch) wide square food storage container. When the cover is placed over a rectangular container, the excess material in each corner is utilized to allow the cover to stretch over the corners of the container. When the same cover is placed over a circular container this excess material remains pleated or bunched in the cover, or the elastic can be pulled down the container further to stretch the excess material. This functionality is illustrated in FIGS. 7 and 8.
FIG. 9

The starting blank or sheet need not be square as shown in the embodiment of FIG. 9 where the sheet has an oblong rectangular configuration. The sheet has two short opposite parallel sides 10SS at the top and bottom as shown and two long parallel opposite sides 10LL. The corners have concave curved cutouts 10C" similar to that of FIG. 1C.

Second Embodiment

Figure 10A:
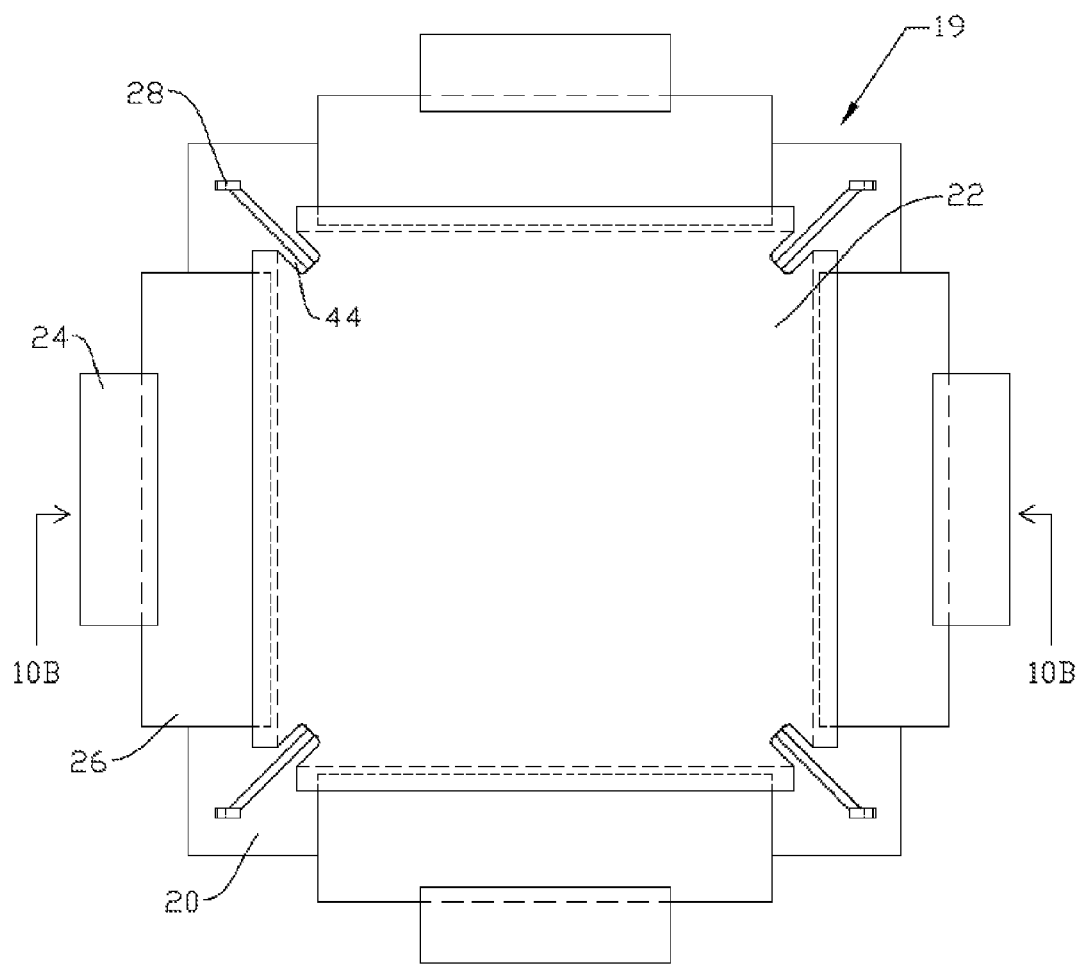
FIG. 10A is a plan view of a flexible cover forming apparatus.
Figure 10B:
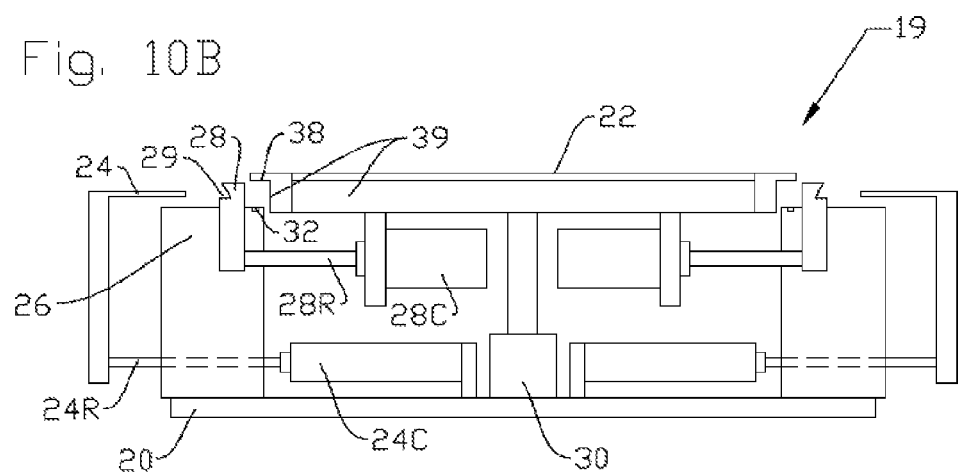
FIG. 10B is a side sectional view of the forming apparatus of FIG. 10A taken along the line 10B-10B of FIG. 10A.

FIGS. 10a-10b

Figure 15:
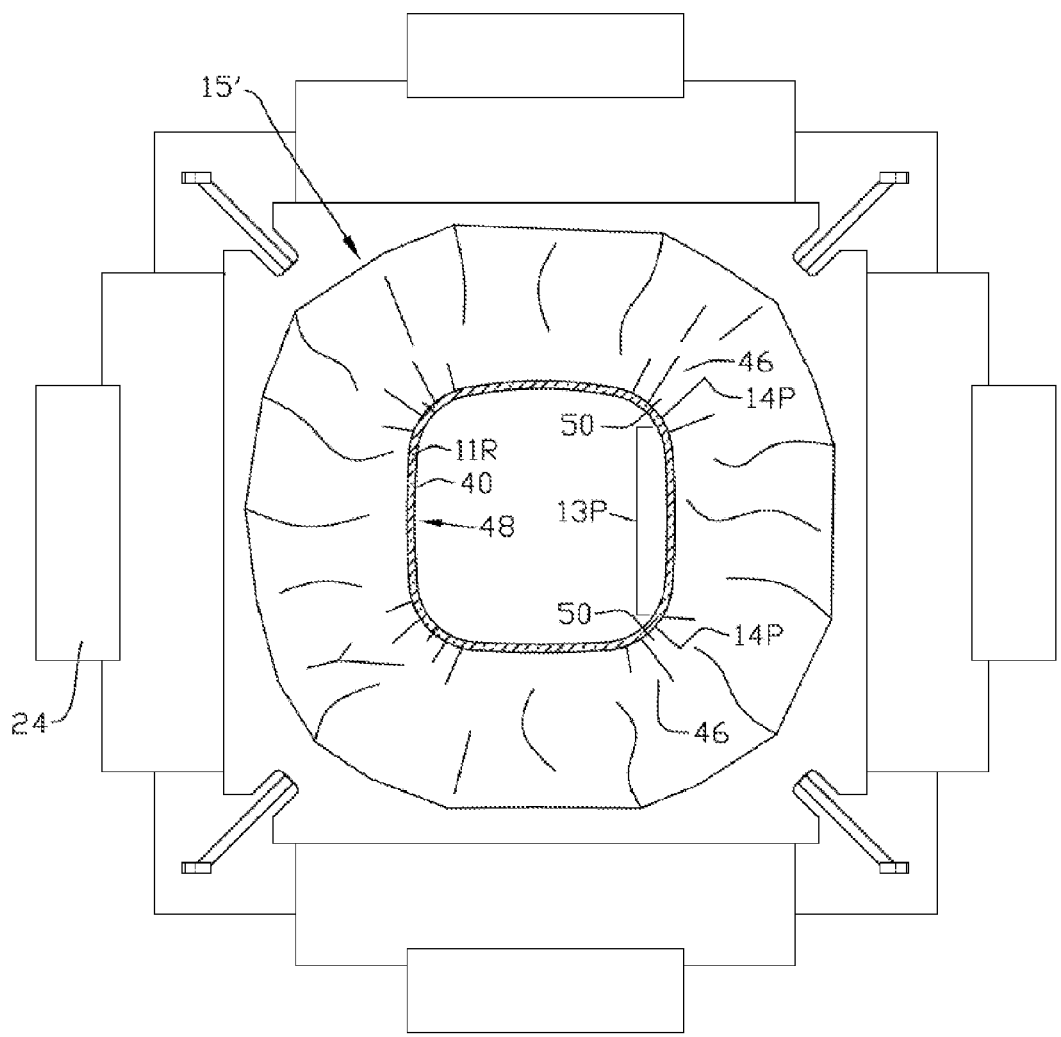
FIG. 15 is a plan view of the formed cover removed from the cover forming apparatus with the rubber band relaxed, thereby drawing the four sides inward and gathering the corners and storing the excess material in corner pleats.

FIGS. 10A and 10B are perspective and side views respectively of a forming apparatus 19 for making a flexible container cover 15' (FIG. 15). The forming apparatus comprises a generally rectangular shaped forming mandrel or forming die 22 (FIG. 10A) having a rectangular top and four side surfaces 39 (FIG. 10B) extending down from under the top so that the top has four ledges or shelves extending out from sides 39. Each ledge or shelf has an eave or undercut surface 38 parallel to the surface of the top but facing downward.

The overall length, width and shape of the mandrel are predetermined by the desired size and shape of the flexible container cover to me made. For example to make a cover that can stretch to 35.6 cm×35.6 cm (14 inches×14 inches) the top of the mandrel can be approximately 30.5 cm×30.5 cm (12 inches×12 inches).

The undercut surface is preferably horizontal as shown in FIG. 10B and each undercut surface is joined to its downwardly extending respective vertical side surface 39 at a 90° angle. In this example each undercut surface 38 is approximately 6.35 mm (0.25 inch) deep and each side surface 39 is approximately 9.525 mm (0.375 inch) tall. However, these dimensions can be varied and other dimensions and shapes can be used so long as a suitable undercut surface is provided along the sides of the mandrel for reasons to be explained below.

The mandrel also includes a clearance slot or alcove 44 (FIG. 10A) cut into each corner for reasons to be described below. The underside of the mandrel is connected to an actuating mechanism, such as an air cylinder 30 (FIG. 10B) which is connected to a base plate 20. Air cylinder 30 is designed to move mandrel 22 vertically up and down. Apparatus 19 further includes four sealing bars 26, one adjacent each side of the mandrel and connected to base plate 20. A portion of each sealing bar 26 (FIG. 10B) is located directly below undercut surface 38 and the rest of each sealing bar extends outwardly. Four L-shaped tucker blades 24 are spaced out from the sealing bars, with each tucker blade having a vertical portion and a horizontal, inwardly extending top portion atop the vertical portion. The vertical portion of each blade is connected to a horizontal rod 24R which is connected to an actuating mechanism, such as air cylinder 24C, which is in turn connected to base plate 20.

Air cylinder 24C is designed to move tucker blade 24 laterally inward toward the sides of the mandrel and back out again. A set of four vertically extending posts or hooks 28 are located at each corner of the mandrel and are connected to a rod 28R which is connected to an actuating mechanism, such as an air cylinder 28C, which is in turn connected to the underside of mandrel 22. Air cylinder 28C is designed to pull the hooks laterally inward into clearance slots or alcoves 44 cut into the corners of the mandrel and then push them back out again. In this example the tops of the hooks have an angular notch or locator groove 29 in order to position and hold an elastic band as will be described below.

The forming apparatus further includes four heating elements 32 which are located longitudinally along the top of each sealing bar and positioned under undercut surfaces 38 of the mandrel. The heating element is made from a strip of resistance wire, usually an alloy of Ni, Cr, and Fe and sold under the trademark Nichrome by the Driver-Harris Co., of Morristown, N.J. Such resistance wire is commonly used as a heating element in toasters and hair dryers. Other suitable heating element materials are well known in the art and can also be used. The resistance wire is insulated from the sealing bar by the use of a strip of heat-resistant insulating tape (not shown). The top of the wire is also covered by a strip of heat-resistant insulating tape (not shown). The free ends of the wire are connected to a power source (not shown) which can be turned on and off. When a predetermined electrical current is passed through the wire, the wire quickly becomes very hot. Although in this example I use resistance-wire heating technology, there are a number of other different heat sealing technologies well known in the art which can be used as an alternative for heat sealing, such as ultrasonic vibration energy (ultrasonic sealing), high-frequency dielectric sealing (induction heating), a heated sealing clamp, a heated bar, or a blast of hot air. Although not shown in the drawings, a rubber pad can also be attached to the undercut surface of the mandrel and positioned directly above the sealing wire to provide a formable mating surface for the sealing process to be described below.

Operation

Figure 11A:
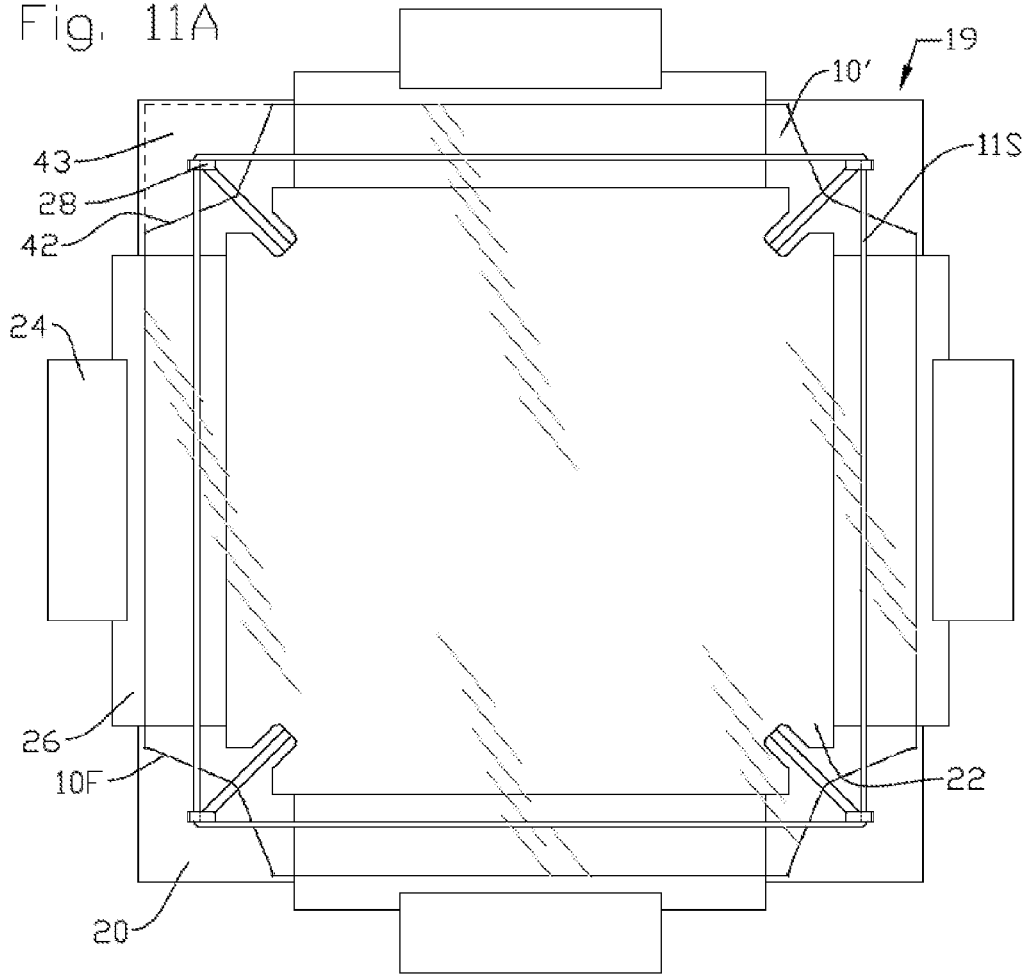
FIG. 11A is a plan view of a flexible cover forming apparatus with a film sheet laying flat on the top surface of a forming mandrel and an elastic band stretched around a set of hooks located at the corners of the mandrel.
Figure 11B:
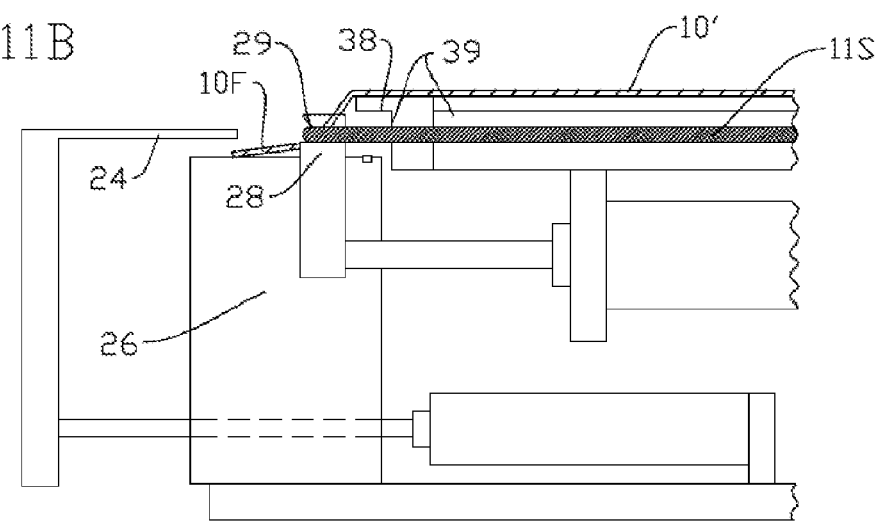
FIG. 11B is a partial side view of the apparatus and components of FIG. 11A.

Second Embodiment—FIGS. 11a-11b

As shown in FIGS. 11A and 11B, apparatus 19 is used to make a flexible container cover 15' (FIG. 15) by placing or draping a film sheet 10' across the top surface of mandrel 22. The sheet can be made from any flexible film material, such as polyethylene, polypropylene, polyester, nylon, or any combination of these and other materials, that is suitable for use in covering bowls, plates, and other objects. Alternatively a biodegradable film can be used, such as polylactic acid (PLA) or polyvinyl alcohol (PVA), which contains starch in order to biodegrade. The size of the sheet is predetermined to fit a specific size range of container openings. The thickness of sheet 10' can be any thickness of film available. A part of or the entire sheet can have optical properties that are clear, transparent, translucent, and opaque. For this embodiment a 35.6 cm (14 inch) square sheet of low density polyethylene (LDPE) with a thickness of 25.4 microns (0.001 inch) is used. A corner cut 42 has been made to remove an amount of material in order to create a recess or space 43 from the apparent intersection of each pair of adjacent sides as shown by the dotted line area in the upper left hand corner of FIG. 11A. Corner cut 42 comprises two straight cuts, each of which forms an acute angle with the edge of the sheet adjacent the corner of the sheet, so that the two straight cuts intersect at an obtuse angle spaced inward from the corner of the sheet. In lieu of these angular cuts, right-angled or curved cuts can be made to remove corner portions of the sheet. The removed corners form four elongated flaps 10F along each side of the sheet between adjacent corner cuts. The sheet is positioned so that hooks 28 are within cut corner space 43 and the flaps extend past the sides of the mandrel. The outside edges of flaps 10F rest atop sealing bar 26 (FIG. 11B).

Next elastic band 11S is stretched around four hooks 28 as shown in FIG. 11A, forming a rectangular shape with four respective straight sections running parallel to the sides of the mandrel and along the length of each flap. The elastic band is preferably made from any thin elastic material such as latex (natural rubber), or latex-free material such as polyisoprene, polyurethane, silicone, or a combination of these and other materials in any color available. A continuous band can be extruded without a seam, or can be formed from an elastic string or thread having one or more seams to form into a band. The elastic band has an unstretched, relaxed or free length less than the length of the perimeter or periphery of the plastic sheet. As shown in FIGS. 11A and 11B, the band is held in a stretched configuration by the notches 29 in the hooks and each straight segment runs longitudinally along the top of each respective flap roughly centered between the outside edge of the flap and the edge of the top surface of the forming mandrel.

FIGS. 12A-12B

Figure 12A:
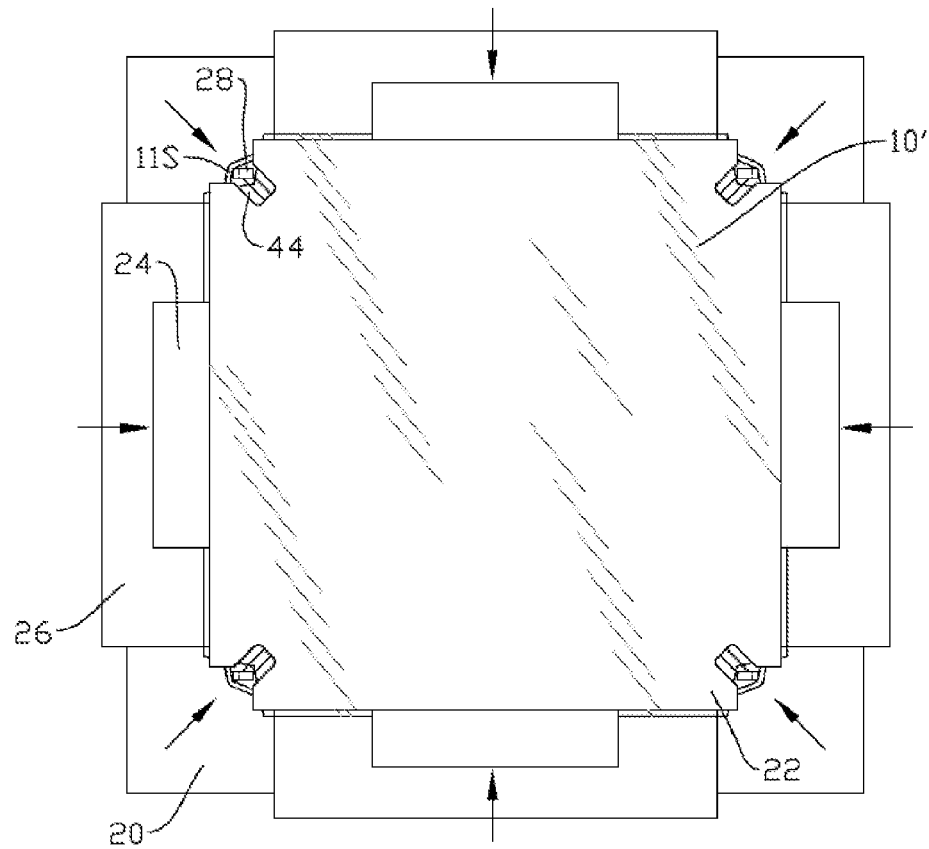
FIG. 12A is a plan view of the apparatus showing the hooks being moved to a position laterally inward and positioned within slots cut into each corner of the mandrel and showing the tucker blades being moved to a position laterally inward against the sides of the forming mandrel.
Figure 12B:
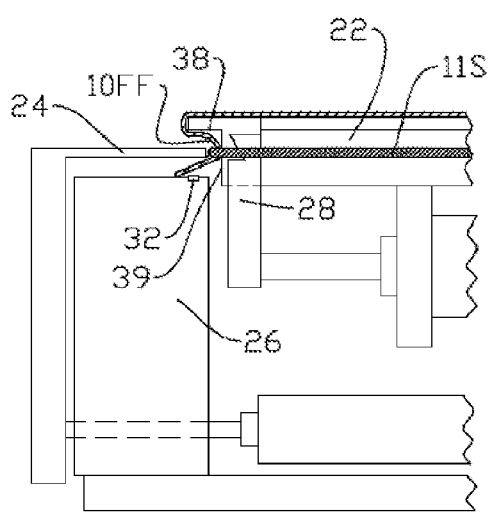
FIG. 12B is a partial side view of the apparatus and components of FIG. 12A which shows the flap being folded inward by the rubber band and tucker blade pushing against the elastic band.

Next as shown in FIGS. 12A and 12B, hooks 28 are retracted laterally (in the direction of the arrows or toward the center of the mandrel) into the clearance slots 44 at each corner of the mandrel. This causes band 11S to contract slightly, allowing each straight section to pull and fold the length of the center portion of each respective flap 10F inward to create four folded flaps 10FF (FIG. 12B). Simultaneously with the hooks retracting, tucker blades 24 are moved laterally inward (in the direction of the arrows), so that each blade penetrates an open end of its respective folded flap and pushing each straight section of the band and the folded edge evenly against side surface 39 of the mandrel.

FIG. 13

Figure 13:
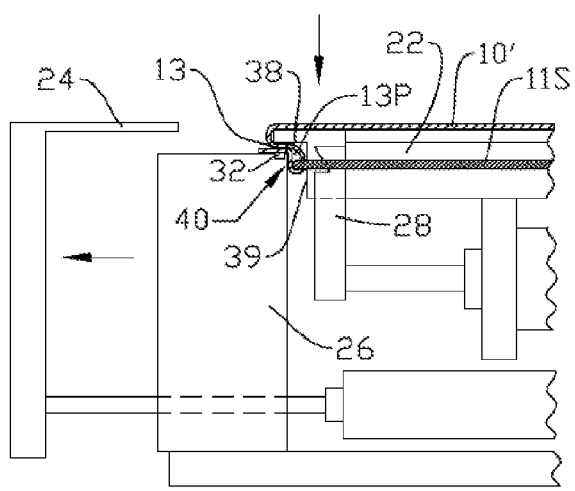
FIG. 13 is a partial side view of the apparatus and components of FIG. 12B, but with the tucker blade returned it its outward position and the mandrel being moved to a down position forming and sealing a hem to form a sleeve containing the elastic band.

Next, as shown in FIG. 13, tucker blades 24 move laterally outward and the mandrel is moved downward so that the top surface of the sealing bar presses against the underside of the ledge or undercut portion 38 of the mandrel, thereby forming hems 40. Next heating element 32 is activated to fuse and seal the hem, forming a heat-sealed seam 13 and pocket 13P containing elastic band 11S along each side of the sheet.

FIGS. 14A-14B

Figure 14A:
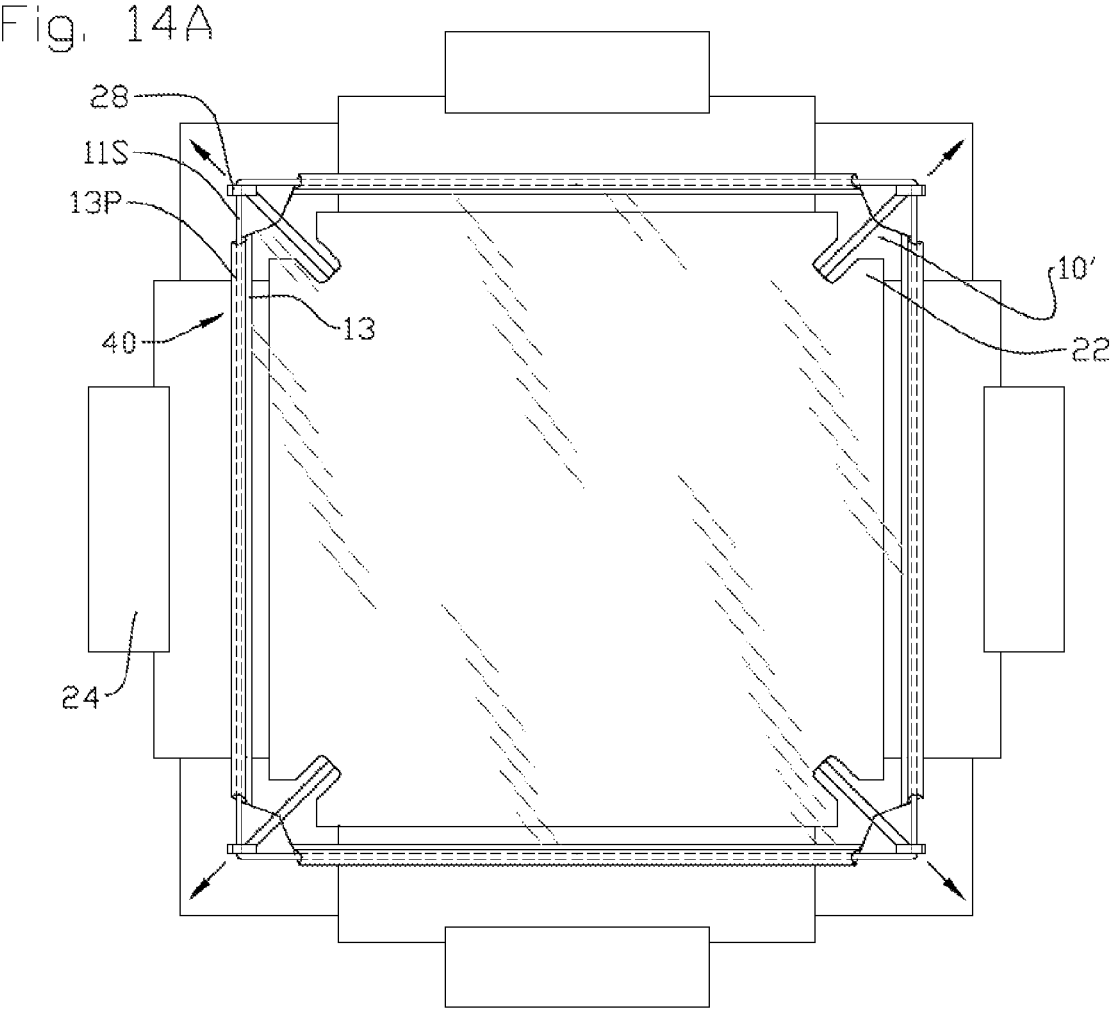
FIG. 14A is a plan view of the apparatus showing the hooks being returned to their initial starting position thereby stripping the formed cover from the underside of the forming mandrel.
Figure 14B:
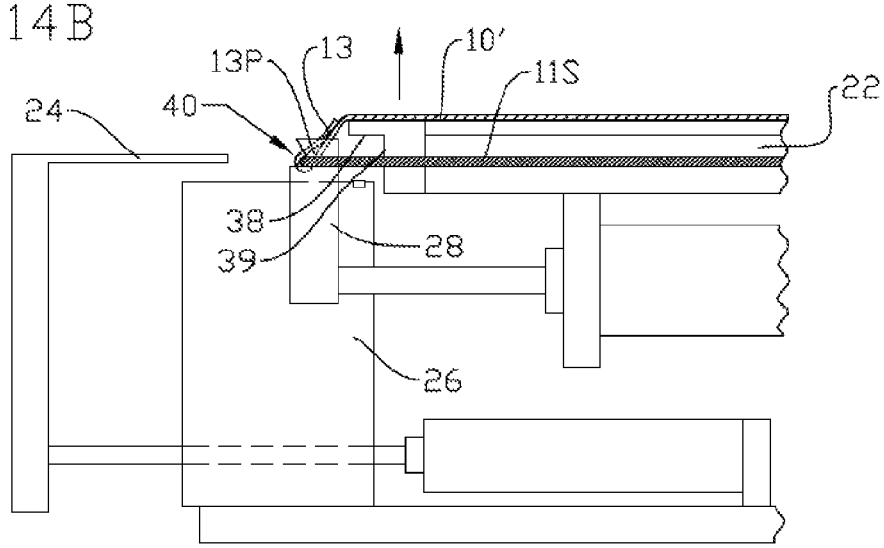
FIG. 14B is a partial side view of the apparatus and components of FIG. 14A.

Next as shown in FIGS. 14A and 14B, mandrel 22 is raised to its starting position and hooks 28 are moved laterally outward, stretching the elastic band within the hems along each side and pushing the hems outward and clear of the sides of the mandrel. This process automatically strips the formed cover from the undercut mandrel surface.

FIG. 15

When finished cover 15' (FIG. 15) has been released from the hooks, elastic band is allowed to relax and contract to become relaxed band 11R. The band pulls the sides toward the center and gathers the corners into corner pleats 14P as discussed in the first embodiment. This forms a cover with expandable opening 48 comprised of continuously circumscribing hem 40 made of four pockets 13P abutting end-to-end and separated by an expansion joint 50. The cover has four expandable corners 46 which expand as necessary to cover both round and rectangular containers with similar size openings.

Alternative Embodiments

FIG. 16

Figure 16:
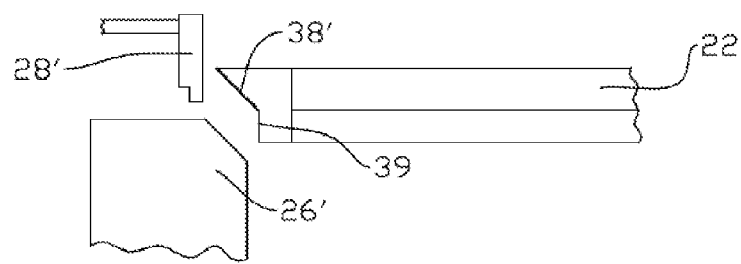
FIG. 16 is a partial side view of an alternative design for an angular mandrel undercut and sealing bar surface, and an alternative configuration for hooks which are suspended from above instead of below the forming mandrel.

FIG. 16 shows an alternative design for the forming mandrel undercut and sealing bar surface. In lieu of horizontal undercut surface 38 (FIG. 10B), the apparatus can have an undercut surface 38' that angles or tapers inward from the top of the forming mandrel. The matching surface of sealing bar 26' will also change to a similar angle as shown in FIG. 16.

FIG. 16 also illustrates an alternative way in which the hooks can be mounted. Hooks 28' can be suspended from above the mandrel (instead of being connected below the mandrel) and can be moved downward in order to place the elastic band around the mandrel. In lieu of hooks, a continuous ring or die (not shown) can be used that would first hold the stretched rubber band around its circumference, next telescope over the forming mandrel, and then use a mechanism for pushing the band off of the die and around the forming mandrel.

Automated Forming Carousel

FIG. 17

Figure 17:
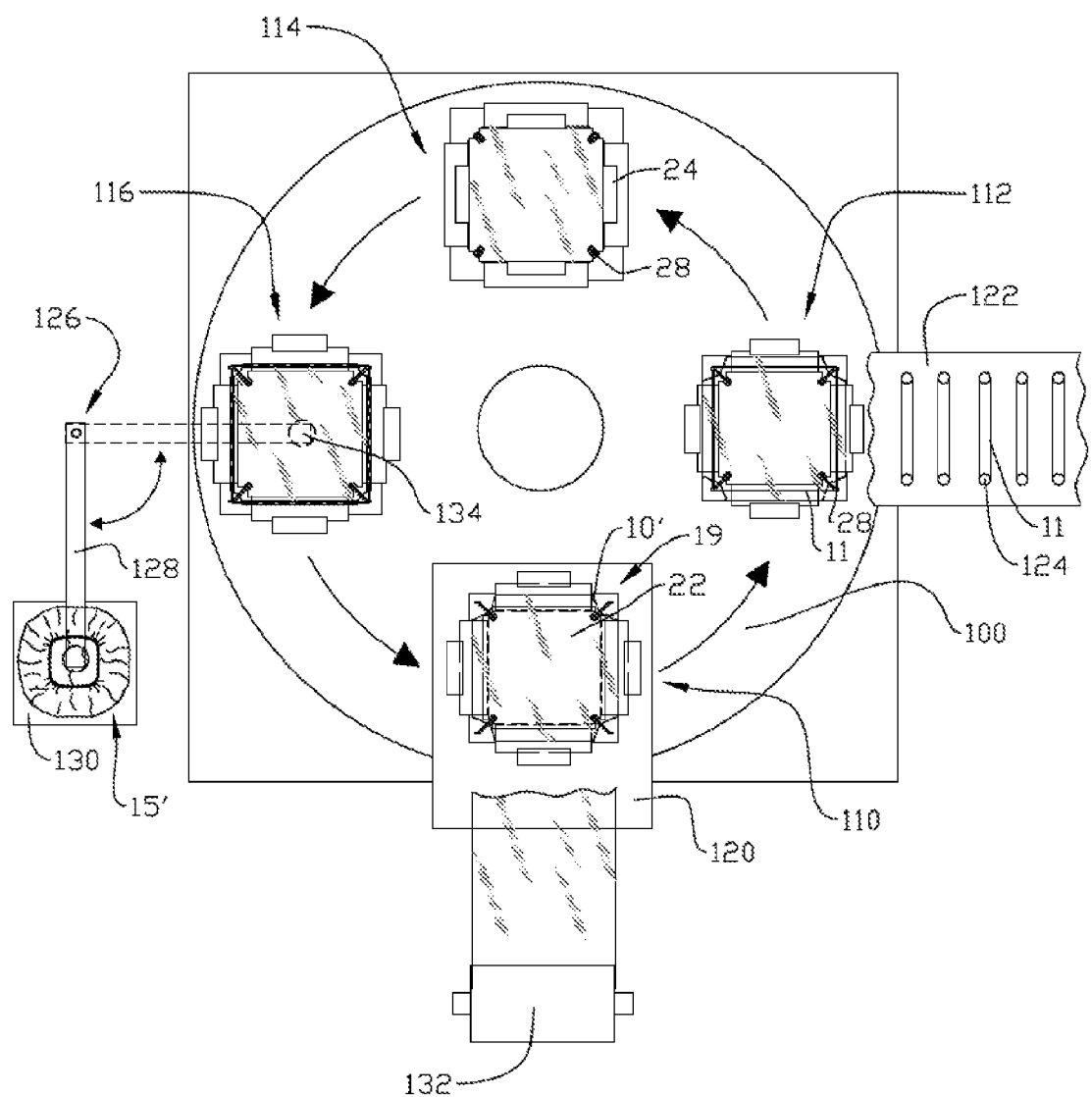
FIG. 17 is a plan view illustrating an automated machine and process for manufacturing flexible container covers.

FIG. 17 illustrates an automated assembly carousel (circular assembly line) for manufacturing flexible container covers. The carousel integrates the forming apparatus and process disclosed in the second embodiment along with additional processing steps and apparatus. The carousel comprises a rotating turntable 100 with four forming stations 19 secured to the turntable and positioned 90° apart. Each forming station is comprised of a forming mandrel, sealing bars with a heating element, tucker blades and a set of elastic band hooks at each corner of the forming mandrel as described. The forming stations move together on the rotating turntable in a counterclockwise (CCW) direction. There are four fixed positions or stations that correspond to the positions of each of the four mandrels.

A first station 110 comprises a die-cutting apparatus 120 which includes an unwind stand, web guides, and a punching or cutting unit (not shown), all well known in the art.

A second station 112 comprises a band-applying apparatus 122 employing a conveyor of matching sets of feeding pins 124 which automatically stretch and release rubber bands 11 around the mandrel hooks. Bands 11 can be put on the feeding pins by a variety of methods. For example, the bands can be manually stretched around the feeding pins by a worker. Or the bands can automatically be formed around the pins from two feeds of thread being attached at each end by a fastener device (not shown). Alternatively an automated descrambling apparatus (not shown) can be used to descramble individual rubber bands from a jumbled mass and place them on the hooks.

At a third station 114 the hem is formed along the side of the sheet and sealed as previously described.

At a forth station 116 the cover is automatically stripped from the undercut mandrel surface as previously described and then the formed cover is removed from the hooks by an accumulation apparatus 126 which is designed to pick up and stack the finished covers after they have been stripped from the forming mandrel. The accumulating apparatus can comprise a reciprocating overhead arm 128 equipped with one or more vacuum cups 134 for picking a stripped cover and moving it to an accumulation bin 130.

Starting at first station 110, the die cutter apparatus 120, a roll of film material 132 is loaded on the unwind stand and fed through web guides (not shown) to a die cutter (not shown). Next the die cutter punches film sheet 10' and places the sheet on top of mandrel 22. The sheet is laid with a mechanical positioner, or alternatively with a blast of compressed air (not shown). A series of small vacuum holes (not shown) in the top of the mandrel hold the sheet in place when the turntable moves or indexes to the next station.

Next the turntable rotates 90° CCW as shown by the arrows to second station 112 to place the first mandrel with the sheet under band applying apparatus 122 where the apparatus applies bands 11 to mandrel hooks 28.

Next the turntable moves to third station 114 where hooks 28 and tucker blades 24 move laterally inward as previously discussed to fold the elongated flaps along each side of the mandrel. Next tucker blades 24 are moved back outward (not shown) and the forming mandrel is moved downward to seal the hem through the application of heat and pressure between the undercut surface of the mandrel and the sealing bars.

Finally the turntable moves to fourth station 116 where the forming mandrel moves back upward to its starting position and the mandrel hooks are moved laterally outward from the channels, thereby stripping the cover from the undercut sides of the mandrel as previously shown and described. Accumulator apparatus 126 next moves into position above the formed cover, and with the use of vacuum, pulls it off of the hooks and transfers it to an accumulation bin 130. The process is repeated sequentially as each mandrel intermittently indexes to each respective station. If the dwell at each station is 0.75 second and it takes 0.25 second to move a mandrel between stations, the total time to complete one cover is 4 seconds, so the throughput will be one finished cover per second, or 60 finished covers per minute.

CONCLUSION, RAMIFICATIONS, SCOPE

The reader will see that according to the disclosure, I have provided a cover that, in various aspects, has one or more of the following features: it can easily fit both circular and rectangular plates and containers, it is sanitary and esthetically pleasing, it is microwavable, and it can be easily manufactured.

While the above description contains many specificities, these should not be construed as limitations on the scope of the invention, but as exemplifications of the presently preferred embodiments thereof. Many other ramifications and variations are possible within the teachings of the disclosure.

For example covers to fit larger size containers and plates can be made by using a larger size sheet and/or elastic band. Likewise covers designed to fit smaller plates and containers can be made by using a smaller size sheet and/or elastic band. The shape of the rectangular sheet can have equal length sides to form a square, or can have two sides that are longer than the other two. It can be translucent or opaque, as well as transparent. The cover can be used to cover trays, beverage containers, laboratory containers, etc., as well a plates and food containers.

The cut off corners on the sheet can be a chamfer cut, a concave cut, a V-shaped cut, etc., so long as the removal of material provides room for the hooks to be positioned to the inside of the apparent intersection of the adjacent sides.

In lieu of providing a heating element on the sealing bar, a heating element can be located along the mandrel's undercut surface and a rubber or foam strip can be provided along the top of the sealing bar.

For higher heat applications polypropylene, nylon, or polyethylene terephthalate (PET) can be used in lieu of polyethylene. Cast polypropylene for example is similar to polyethylene in is formability and clarity, but has a melt point that is approximately 100 degrees higher. Nylon and PET are both used as materials for oven-heatable turkey bags and will provide a cover with an even higher operating temperature than polypropylene. For a biodegradable cover a biodegradable film such as polycarprolactone (PCL), polyvinyl alcohol (PVA) and polylactic acid (PLA) can be used. These polymers contain starch in order to biodegrade.

Different materials and different colors can be used for the elastic or rubber band. For example a different color rubber band can be used to identify different size covers. And clear polyurethane bands can be used in lieu of colored rubber bands. The cross-section of the band can be rectangular, oval, triangular, or circular, etc.

The size and shape of the apparatus tool parts, such as the size and shape of the forming mandrel, the shape and size of the undercut surface, the size, shape, height and angle of the hooks, the sealing bars and the tucker blades, can all be modified as necessary without departing from the scope of the claims. For example the notch on the hooks or post can be eliminated or have an L-shaped contour to hold the band as shown in FIG. 16. Instead of the tucker blades a blast of air can be used to push the folded flaps evenly under the undercut surface and against the mandrel sides.

The stations of the automated assembly line process can be configured in a linear layout instead of a circular layout. There can be more than four stations with additional stations breaking up the major functions of the four stations disclosed into more than one station so that the time at each station is less, and therefore the overall machine throughput can be increased. Instead of a reciprocating arm the accumulator apparatus can be a rotating station with plural picking heads for removing the finished covers from the forming mandrel in timed sequence.

While certain representative embodiments and details have been shown for purposes of illustrating the disclosure, it will be apparent to those skilled in the art that various changes in the methods and apparatus disclosed may be made without departing from the scope of the disclosure, which is defined in the claims and their legal equivalents.

I claim:

1. A method for manufacturing a flexible container cover, comprising:
   providing a flat sheet of flexible film having a generally rectangular shape with four sides, four recessed cut corners, and a flap along each side of said sheet between each adjacent pair of cut corners,
   providing an elastic band,
   providing a forming mandrel having a generally rectangular top surface with four sides, four corners and a slot cut into each corner, said mandrel having a ledge along each side of said top surface, said ledge having an eave or undercut surface and a side surface depending therefrom, the perimeter of said mandrel being smaller than the perimeter of said sheet,
   providing a set of four sealing bars, said sealing bars positioned adjacent said respective sides of said mandrel with a gap between each sealing bar and its respective undercut surface,
   providing a set of tucker blades, said tucker blades positioned adjacent said respective sides of said mandrel, said tucker blades being in a first position spaced from said undercut surface,
   providing four hooks, one at each corner of said mandrel, said hooks being in a first position outside of said slots,
   laying said sheet onto said top surface of said mandrel so that said flaps extend past said sides of said mandrel and said hooks are positioned within the region defined by said four recessed cut corners of said sheet,
   stretching said elastic band around said hooks so that said hooks hold said elastic band in a generally rectangular configuration with four straight sections, each of said straight sections running parallel to and positioned above one of said flaps,
   moving said hooks inward to a second position within said slots so that said elastic band contracts, causing each of said straight sections to fold a middle portion of each of said respective flaps inward,
   moving said tucker blades to a second position under said undercut, thereby pushing said folded flaps against said side surface,
   moving said tucker blades back to said first position,
   closing said gap between said sealing bar and said undercut surface in order to form a hem along each side of said sheet,
   sealing said hem to form said flexible container cover,
   moving said hooks back into said first position, thereby stripping said cover from said undercut surface of said mandrel, and
   removing said cover from said hooks.

2. The method of claim 1 wherein said hem is sealed through the application of heat and pressure.

3. The method of claim 2 wherein said heat is applied by a heating element installed along a top surface of said sealing bars.

4. The method of claim 1 wherein said recessed cut corners of said sheet are formed by two straight cuts, each of which forms an obtuse angle with a side edge of the sheet so that said two straight cuts intersect at an obtuse angle spaced inward from the apparent intersection of adjacent sides.

5. The method of claim 1 wherein said hooks are moved inward and back and said tucker blades are moved between said first and second positions by pneumatic means.

6. The method of claim 1 wherein said hooks each comprise a member having a notch therein.

7. The method of claim 1 wherein said tucker blades each comprise an L-shaped member with a horizontal top section.

8. The method of claim 1 wherein said flat sheet of flexible film is made of plastic and is transparent.

9. The method of claim 1 wherein said forming mandrel, said set of four sealing bars, said set of tucker blades, and said four hooks comprise a first forming station, and further including a plurality of additional forming stations similar to said first station, said forming stations being mounted on a conveyor, said conveyor being arranged to progress through a series of steps with a pause between steps, said laying, stretching, moving, closing, sealing, and removing taking place when said conveyor pauses between steps.

10. The method of claim 1 wherein said eave or undercut surface of said mandrel is selected from the group consisting of horizontal and slanted orientations.

11. An apparatus for manufacturing a flexible container cover, comprising:
   a forming mandrel having a generally rectangular top surface with four sides, four corners and a slot cut into each corner, said mandrel having a shelve or ledge along each side of said top surface, each ledge having an eave or undercut surface,
   a set of four sealing bars, said sealing bars positioned adjacent said respective sides of said mandrel with a gap between each sealing bar and its respective undercut surface,
   a set of tucker blades, said tucker blades positioned adjacent said respective sides of said mandrel, said tucker blades being in a first position spaced apart from said undercut surface, four hooks, one at each corner of said mandrel, said hooks being in a first position outside of said slots, means for moving said hooks inward to a second position within said slots so that an elastic band stretched around said hooks will contract, and when side flaps of a sheet placed over said mandrel hang inside said band, said contracting band will fold a middle portion of each of said respective flaps inward, means for moving said tucker blades to a second position under said undercut so as to push said folded flaps of said sheet, when present, inward and under said undercut, said means for moving said tucker blades also arranged to move said tucker blades back to said first position, means for closing said gap between said sealing bar and said undercut surface and thereby form a hem along each side of said sheet, when said sheet is present, means for sealing said hem when said sheet is present to form said flexible container cover, said means for moving said hooks also arranged to move said hooks back into said first position, thereby stripping said cover, when present, from said undercut surface of said mandrel.

12. The apparatus of claim 11 wherein said means for sealing said hem is arranged to apply heat and pressure.

13. The apparatus of claim 12 wherein said application of heat is provided by a heating element positioned on said sealing bar.

14. The apparatus of claim 11, further including providing a flat sheet of flexible film having a generally rectangular shape with four sides, four recessed cut corners, and a flap along each side of said sheet between each adjacent pair of cut corners, whereby said sheet can be positioned over said mandrel and formed into a container cover by said undercut surface, said sealing bars, said tucker blades, said hooks, and said means for moving said hooks and said tucker blades and said means for closing the gap between said sealing bars and said undercut surface.

15. The method of claim 1 wherein said flat sheet of flexible film is made of plastic and is transparent.

16. The apparatus of claim 11 wherein said means for moving said hooks and said tucker blades comprise pneumatic means.

17. The apparatus of claim 11 wherein said hooks each comprise a member having a notch therein.

18. The apparatus of claim 11 wherein said tucker blades each comprise an L-shaped member with a horizontal top surface.

19. The apparatus of claim 11 wherein said forming mandrel, said set of four sealing bars, said set of tucker blades, and said four hooks comprise a first forming station, and further including a plurality of additional forming stations similar to said first station, said forming stations being mounted on a conveyor forming an assembly line, said conveyor being arranged to index through a series of steps with a pause between steps.

20. The apparatus of claim 11 wherein said an eave or undercut surface of said mandrel is selected from the group consisting of horizontal and slanted orientations.

* * * * *